United States Patent [19]

Lindenmeier et al.

[11] Patent Number: 4,752,968
[45] Date of Patent: Jun. 21, 1988

[54] ANTENNA DIVERSITY RECEPTION SYSTEM FOR ELIMINATING RECEPTION INTERFERENCES

[75] Inventors: Heinz Lindenmeier, Planegg; Ernst Manner; Gerhard Flachenecker, both of Ottobrunn, all of Fed. Rep. of Germany

[73] Assignee: U.S. Philips Corporation, New York, N.Y.

[21] Appl. No.: 861,205

[22] Filed: May 8, 1986

[30] Foreign Application Priority Data

May 13, 1985 [DE] Fed. Rep. of Germany ....... 3517247

[51] Int. Cl.⁴ ............................................... H04B 1/10
[52] U.S. Cl. .................................... 455/277; 455/133; 455/278
[58] Field of Search ........ 455/273, 277, 278, 133–135, 455/137

[56] References Cited

U.S. PATENT DOCUMENTS 3,840,875 10/1974 Neal .................................... 455/277
4,584,712 4/1986 Isobe et al. .......................... 455/273

FOREIGN PATENT DOCUMENTS

0036139 9/1981 European Pat. Off. .
3326062 1/1985 Fed. Rep. of Germany .
3334735 4/1985 Fed. Rep. of Germany .
223337 11/1985 Japan .................................. 455/277

*Primary Examiner*—Michael A. Masinick
*Attorney, Agent, or Firm*—Thomas A. Briody; William J. Streeter; Gregory P. Gadson

[57] ABSTRACT

An antenna diversity system for the mobile reception of frequency-modulated oscillations having a receiver, antennae and a diversity processor. An optimum system according to the invention includes an FM tuner with intermediate frequency part (2) and at least two antennae, while the diversity processor (3) receives an intermediate frequency signal or high-frequency signal, which corresponds to a given linear combination derived from the antenna signals. The diversity processor (3) further includes an FM demodulator (32) with a succeeding frequency sweep threshold detector (31) and a device by which, in dependence upon the occurrence of an interference-dependent frequency sweep pulse exceeding the frequency sweep threshold of the frequency sweep threshold detector (31) in the intermediate frequency of high-frequency signal, another linear combination derived from the antenna signals is supplied to the input side of the tuner with intermediate frequency part (2).

17 Claims, 5 Drawing Sheets

ANTENNA DIVERSITY RECEPTION SYSTEM FOR ELIMINATING RECEPTION INTERFERENCES

BACKGROUND OF THE INVENTION

The invention relates to an antenna diversity system for the mobile reception of frequency-modulated signals comprising a receiver, antennae and a diversity processor. Such antenna diversity systems are preferably used for improving the radio reception in cars. Hitherto, mainly systems having two antennae have been employed. Such an antenna diversity system is known, for example, for European Patent Application No. 0 036 139 B1. In this case, the system is used for the stationary mode of reception. In this system, several reception signals are derived from the reception signals of two antennae with the use of phase shift devices and these signals are passed on to the receiver by means of a switch. With the use in cars, the dynamic behaviour of the diversity system is of major importance. Due to the movement of the car, the antenna voltages are varied constantly so that the signal quality has to be checked constantly. In contrast with the diversity system known from the aforementioned European Patent Application, the rapid identification of the occurrence of an interference in the reception signal is therefore absolutely necessary. The known system operates slowly because for a stationary use a given situation of reception exists for a long time. For the radio reception in the car, the transmission property of the path between the transmission antenna and the reception antenna is constantly varied during driving. The superimposition of electromagnetic waves having long different travelling times results in that an increased noise and a distortion of the low-frequency message are obtained at the output of the frequency demodulator. In the case of stereo transmission, this effect also leads to an increased cross-talk between the two stereo channels. Due to the movement of the car and due to the directional effect of the reception antenna, adjacent channel interferences and intermodulation interferences are varied. The system is often also disturbed by electrical interferences of the electrical aggregates forming part of the car.

SUMMARY OF THE INVENTION

The present invention therefore has for its object to provide an antenna diversity system which avoids the disadvantage of the slow interference identification and which, when an interference occurs, selects from a supply of antenna signals the optimum antenna signal or a combination of antenna signals.

According to the invention, this object is achieved in that the system comprises an FM tuner which an intermediate frequency part, at least two antenna 1-i (i=1, 2, ... n) and an intermediate frequency or high-frequency signal is supplied to the diversity processor, which signal corresponds to a given linear combination derived from the antenna signals, and in that the diversity processor comprises an FM demodulator with a succeeding frequency sweep threshold detector and means by which, depending upon the occurrence of a frequency sweep pulse determined by interference and exceeding the frequency sweep threshold of the frequency sweep threshold detector in the intermediate frequency or high-frequency signal, another linear combination derived from the antenna signals is supplied to the input side of the turner with an intermediate frequency part.

According to a further feature, the antenna diversity system is characterized in that the system comprises an FM tuner with an intermediate frequency part, at least two antennae 1-i (i=1, 2, ... n) and in that an intermediate frequency or high-frequency signal is supplied to the diversity processor, which signal corresponds to a given linear combination derived from the antenna signals, while the diversity processor comprises an AM demodulator with a succeeding amplitude threshold detector and an FM demodulator with a succeeding frequency sweep threshold detector and means by which, upon simultaneous occurrence of an amplitude burst exceeding the amplitude threshold of the AM threshold detector and of a frequency sweep pulse determined by interference and exceeding the frequency sweep threshold in the intermediate frequency or high-frequency signal, another linear combination derived from the antenna signals is supplied to the input side of the turner with an intermediate frequency part.

The advantages obtained with the use of the invention reside in the suppression of audible reception interferences also in a rapidly moving car. An essential advantage also consists in that a main part of the known, frequently occurring interferences obtained by widely different causes are avoided by the use of the invention. Special examples of these interferences are amplitude fading due to multipath reception of waves having small travelling time differences and distortions at the output of the FM demodulator due to multipath reception of superimposed subwaves having substantial travelling time differences, adjacent channel interferences, intermodulation interferences due to the reception of large undesired signals and parasitic interferences caused by the aggregates of other cars.

BRIEF DESCRIPTION OF THE DRAWINGS

In order that the invention may be readily carried out, it will now be described more fully, by way of example, with reference to the accompanying drawings, in which.

DETAILED DESCRIPTION OF THE INVENTION

Figure 1:
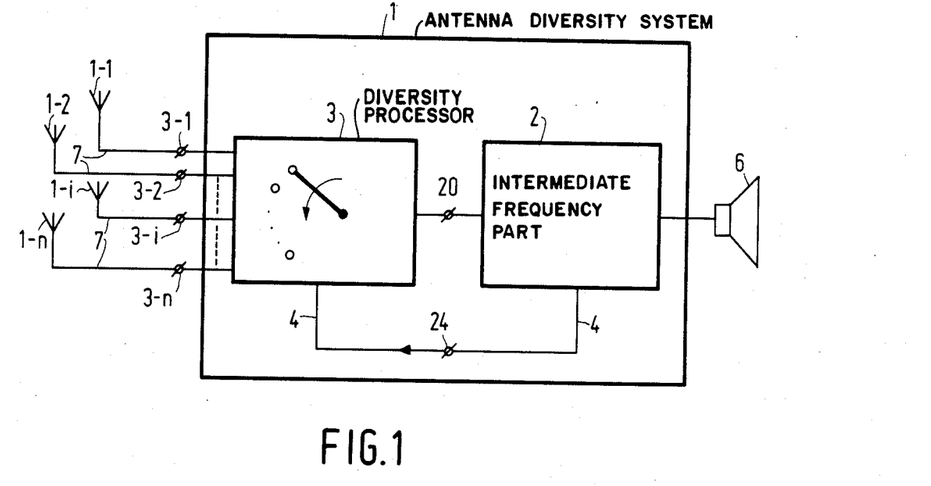
FIG. 1 shows a block circuit diagram of an antenna diversity system according to the invention.
Figure 2:
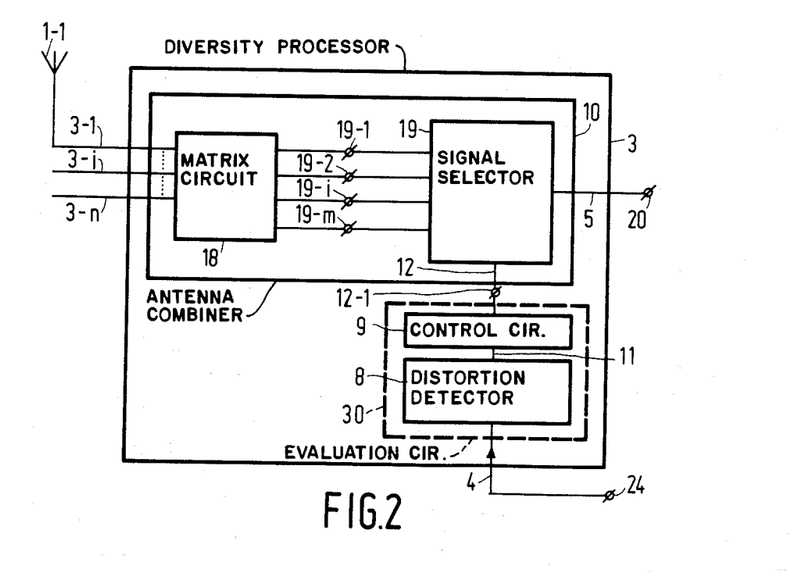
FIG. 2 shows a block circuit diagram of a diversity processor for use in the antenna diversity system shown in FIG. 1.
Figure 3:
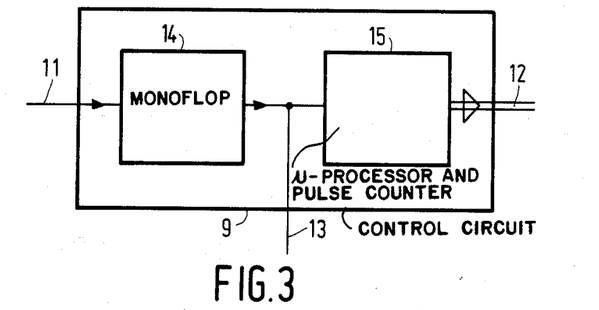
FIG. 3 shows a block circuit diagram of a control circuit for use in the diversity processor shown in FIG. 2.

FIG. 1 shows an antenna diversity system 1 comprises n antennae 1-1, 1-2, ..., 1-i, ..., 1-n, a diversity processor 3 having an equally large number of inputs 3-1, 3-2, ..., 3-i, ..., 3-n, a succeeding FM tuner with an intermediate frequency part 2 and an intermediate frequency feedback circuit 4 in the diversity processor 3. As shown in FIG. 2, the diversity processor 3 includes a distortion detector 8, as described, for example, in German Offenlegungsschrift No. 33 26 062 or in the non-prepublished German Patent Application No. P 33 34 735, which, upon identification of an interference in the intermediate frequency signal exceeding a frequency sweep threshold or additionally an amplitude threshold, supplies a binary signal through a lead 11 to a control circuit 9. In the case of an interference, this binary signal will lead in a manner to be described more fully to the high-frequency signal supplied via the lead 5 to the FM tuner with the intermediate frequency part 2 being derived in a different manner from the antenna signals of the antennae 1-1, . . . 1-n. Due to the short identification time of the diversity processor 3 for the occurrence of an interference, a correspondingly large number of signal combinations, which can be derived from the antenna signals, can be checked with regard to their signal quality in a short time. Thus it is ensured that at any instant in the case of the presence of at least one non-interfered combination signal such a signal appears by selection at the terminal 20.

In a particularly advantageous embodiment of FIG. 2, the diversity processor 3 is provided with an antenna combiner 10 and an evaluation circuit 30. The antenna combiner 10 serves to select from the n supplied antenna signals of the antennae 1-1, . . . , 1-n a row of m linear combinations and to pass each time one of these linear combinations on to the FM tuner 2 with an intermediate frequency part. Upon the occurrence of an interference according to an interference criterion in the evaluation circuit 30, the antenna combiner 10 is designed so that, whilst driving the evaluation circuit 30, another linear combination is passed on to the FM tuner 2 with intermediate frequency part. For this purpose, the antenna combiner 10 includes a matrix circuit 18 and a signal selector 19, the matrix circuit combining the n antenna signals to m linear combinations of these signals. The signal selector 19 connected to the matrix circuit 18 is in the most general case an addressable switch, which, when driven by an address signal supplied by the evaluation circuit 30 to the lead 12, connects a given signal input 19-1, . . . 19-m to the output 20. Of particular advantage is a binary form of the address signal supplied to the lead 12. In an advantageous embodiment, the evaluation circuit 30 is constituted by a distortion detector 8 and a control circuit 9. The distortion detector 8 consists, for example, either of a broadband FM demodulator 32 (FIG. 15) with a succeeding first frequency sweep threshold detector 31 with direct signal emission (see the broken line) or, if desired, additionally of an AM demodulator (35) with a succeeding second threshold detector (36) and an AND circuit (37), which are both shown in FIG. 15. The said interference criterion occurs with the sole use of an FM demodulator if a frequency sweep interference appears in the intermediate frequency signal of the feedback circuit 4 (FIG. 2), which exceeds a given frequency sweep threshold $V_1$ (FIG. 15) of the suitably adjusted frequency sweep threshold detector (31), which is constituted by a comparator circuit. Consequently, the circuit 51 is a frequency sweep interference indicator. In the case of the additional use of an AM demodulator (35), the said interference criterion is obtained if both an amplitude burst occurs, which exceeds a suitably adjusted amplitude threshold $V_2$ of the AM threshold detector (36) also constituted by a comparator circuit, and a frequency sweep interference appears, which exceeds the aforementioned frequency sweep threshold $V_1$ of the frequency sweep threshold detector (31). Due to the combination in the AND circuit (37), a particularly reliable interference identification is obtained in this manner. When the interference criterion is present, the distortion detector 8 passes via the lead 11 the logic signal "1" (see FIG. 15) on to the control circuit 9 in the evaluation circuit 30. When this signal occurs, a pulse is generated in the control circuit 9, for example, by means of a monoflop 14. This pulse is supplied, as the case may be, to a microprocessor (not shown), which supplies in response thereto a binary address signal, for example, the counter position of a pulse counter (not shown), to the signal selector 19 in order that a given signal input 19-j (j=1, 2, ... m) is connected to the input 20 of the FM tuner 2. In a further embodiment, the signal inputs 19-1, . . . , 19-m at the signal selector 19 are connected according to a given priority list stored in the microprocessor of the control circuit 9 to the input 20 of the FM tuner with intermediate frequency part 2 upon the occurrence of the interference criterion. In accordance with this priority list, address signals 12 are generated in the control circuit 9. Such a priority list is composed with reference to preceding reception measurements on the car and the determination of the efficiency of the various linear combinations of the antenna signals and implemented in the control circuit 9 of the diversity processor 3. In a particularly simple embodiment, the signal inputs 19-1, . . . , 19-m are given the same priority and the signal inputs 19-1, . . . , 19-m are cyclically connected to the FM tuner with intermediate frequency part 2 upon the occurrence of the interference criterion.

Figure 8:
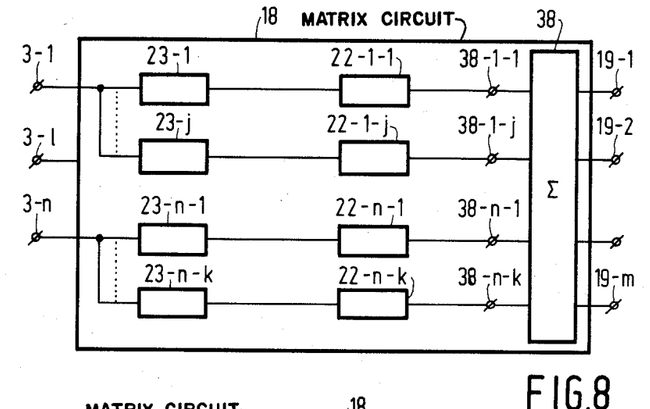
FIG. 8 shows an embodiment of a matrix circuit for use in the antenna diversity system shown in FIG. 2.
Figure 9:
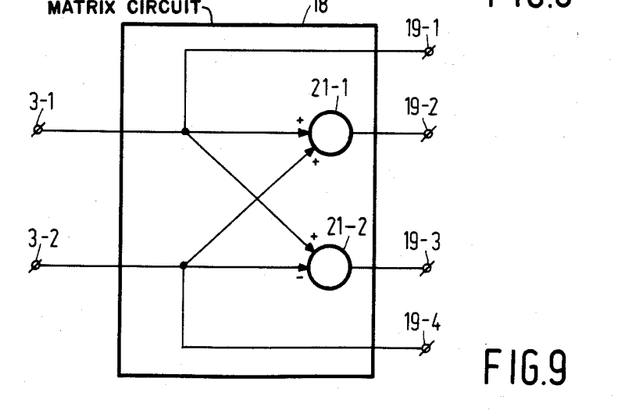
FIG. 9 shows a further embodiment of a matrix circuit for use in the antenna diversity system shown in FIG. 2.
Figure 10:
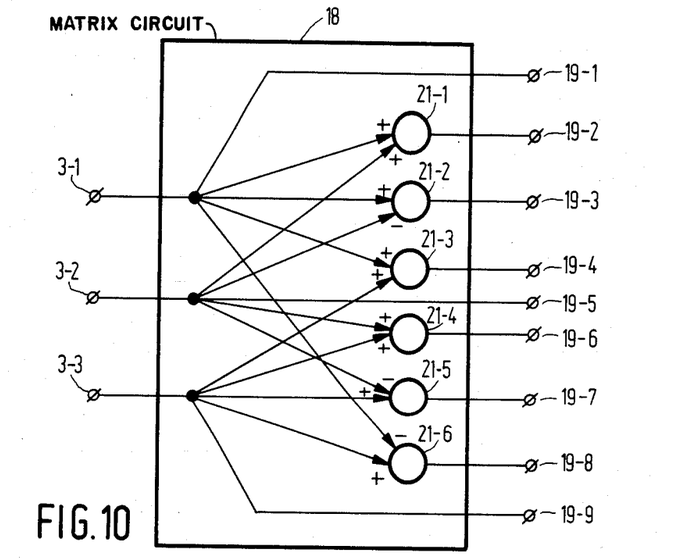
FIG. 10 shows a further embodiment of a matrix circuit for use in the antenna diversity system shown in FIG. 2.

The matrix circuit 18 is generally provided with n antenna inputs 3-1, . . . , 3-n and the signal selector 19 is generally provided with m signal inputs 19-1, . . . , 19-n, as shown in FIG. 2. Each antenna input 3-j (j=1, 2, .., n) is connected to a signal input 19-j (j=1, 2, ..., n) of the signal selector 19 via an amplitude weighting device (FIG. 8) 23-1, 23-j; ... ; 23-n-1, 23-n-k and a phase shift device 22-1, ..., 22-j; ...; 22-i-1, 22-n-k. In a succeeding summing circuit 38, given signals at the inputs 38-1-1, ..., 38-1-j; ...; 38-n-1, ..., 38-n-k are combined with each other by summation to m signals at the outputs 19-1, ..., 19-m. For satisfactory operation it is essential that the selector input signals (19-1, ..., 19-m) formed from linear combinations of the antenna signals are statistically as independent of each other as possible. Linear combinations are formed in that each antenna signal is weighted in amplitude and is changed in phase by means of a phase shifter (22-1, ..., 22-n) (FIG. 8) and all signals are added. For this purpose, the amplitude weighting devices (23-1, ..., 23-n) are formed, for example, so that the average values of the reception signals at the selector inputs (19-1, ..., 19-n) are equally large. In the case of the use of antennae provided with amplifiers, the amplitude weighting devices (23-1, ..., 23-n) are adjusted so that the signal-to-noise ratios at the selector inputs (19-1, ..., 19-n) are substantially equal. Thus, it is ensured that the average signal quality at all selector inputs 19-1, ..., 19-n is the same so that each selector input 19-j (j=1, 2, ... n) is used for the reception mode with the same probability. In the case of approximately equal capacity of the antennae (1-1, ..., 1-n), these amplitude weighting devices (23-1, ..., 23-n) can be in the form of simple through-connections. The phase shift devices (22-1-1, ..., 22-1-j; ...; 22-n-1, ..., 22-n-k) are empirically adjusted so that in the case of interference of several antenna signals the probability of the freedom of interference of the combined signals is as high as possible. Frequently, the number n of the antennae that can be used in a car is limited. In this case, it is effective to choose the number of m of the selector inputs (19-1, ..., 19-m) to be larger than the number of n of the antennae. In the simplest case, m may also be =n and the matrix circuit 18 connects the inputs 3-1, ..., 3-n directly to the corresponding respective outputs 19-1, ..., 19-n. It is particularly advantageous to produce four signals at the inputs (19-1, ..., 19-4) of the signal selector 19, whose signals are formed from two antenna input signals at the inputs 3-1, 3-2. This is effected, for example, as shown in FIG. 9, by addition and subtraction of the two antenna input signals in the addition and subtraction circuits 21-1, 21-2, in which the sum signal and the difference signal are supplied to the signal inputs 19-2 and 19-3, while the antenna input signals are supplied separately to two further signal inputs 19-1, 19-4 of the signal selector 19. Consequently, four mutually strongly independent input signals can be formed from each time two antenna input signals at four signal selector inputs 19-1, ..., 19-4. FIG. 10 shows, by way of example, the use of this principle with three antenna input signals 3-1, 3-2, 3-3, from which new input signals for the signal selector inputs 19-1, ..., 19-9 are formed. Experiments have shown that the increase of the number m of the signal combinations with a given number n of antennae leads to a considerable improvement of the reception with the antenna diversity system. However, this improvement is smaller than with the use of a corresponding number of additional antennae receiving independently of each other. With a given number n of antennae in the car, which do not receive independently of each other, i.e. whose signals are not negligibly correlated to each other, particularly favourable linear combinations of antenna signals can be formed by reception measurements in the car by means of suitable amplitude weighting devices 23-1, ..., 23-n and phase shift devices 22-1, ..., 22-n in such a manner that the occurrence of the interferences becomes more independent at given outputs. These combinations can be realized correspondingly in the matrix circuit 18.

Figure 15:
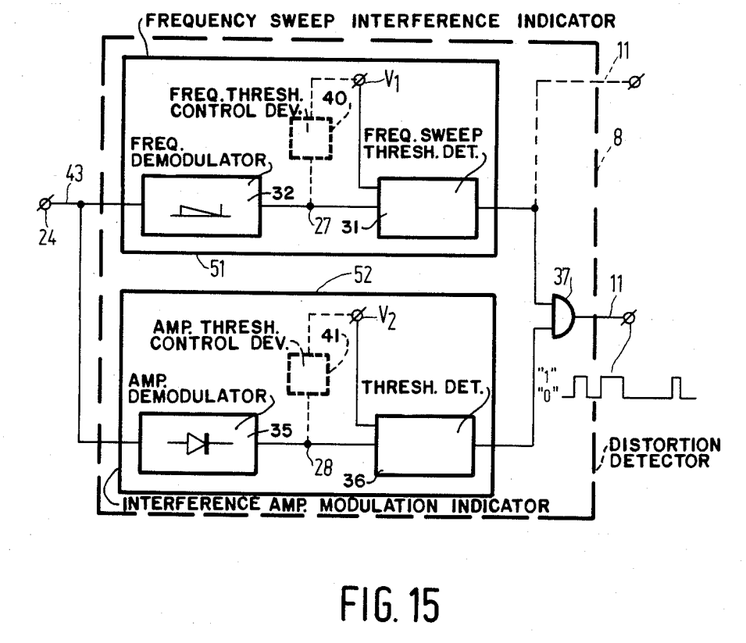
FIG. 15 shows an embodiment of a distortion detector for use in the antenna diversity system shown in FIG. 1.

FIG. 15 shows the principal construction of one embodiment of the distortion detector 8. In this case, the frequency sweep interference and the interference-dependent amplitude modulation in the intermediate frequency and high-frequency signal 4, respectively, are evaluated.

In a particularly simple embodiment, the interference of the signal 4 is determined solely from the frequency sweep interference. In this case, the frequency sweep interference indicator 51 in FIG. 15 consists, for example, of a frequency demodulator 32, whose output signal 27 is supplied to the frequency sweep threshold detector 31. The frequency sweep threshold detector 31 is constructed as a comparator circuit in a simple embodiment. If the actual frequency sweep exceeds a correspondingly determined threshold $V_1$, the output signal of the frequency sweep threshold detector 31 shows in binary form the presence of an interference in the frequency sweep. The frequency demodulator 32 therefore constitutes in conjunction with the frequency sweep threshold detector 31 a frequency sweep interference indicator 51, whose indication depends upon the adjustment of the threshold $V_1$ formed therein, which is adjusted to a higher value than the actual effective frequency sweep.

In an embodiment of particularly high performance of the distortion detector 8, the interference-dependent amplitude modulation of the frequency-modulated signal 4 is additionally obtained in the interference amplitude modulation indicator 52 of FIG. 15 by means of a known amplitude demodulator 35, whose output signal 28 is compared in a succeeding comparator 36 with a threshold $V_2$. The output signal of the comparator 36 therefore shows in binary form the presence of an amplitude interference. A particularly reliable and rapid indication of an interference is guaranteed if by means of an AND circuit 37 the simultaneous presence of a frequency sweep interference and of an amplitude interference is determined by means of the binary output signal 11 of the AND circuit 37. If therefore interference indications occur simultaneously at the output of the frequency sweep interference indicator 51 and at the interference amplitude modulation indicator 52, an interference of the intermediate or high-frequency signal 4 is indicated at the output of the AND circuit 37 in the logic signal 11.

In a particularly simple embodiment, the frequency sweep threshold $V_1$ and the amplitude threshold $V_2$, respectively, are fixedly adjusted in the distortion detector 8 to an average value suitable for a large number of reception applications.

The interference criterion for the FM interference occurs if the frequency sweep threshold $V_1$ is exceeded by the frequency sweep in the intermediate frequency of high-frequency signal at the point 27 or if in the case of the simultaneous use of an amplitude demodulator 35 the amplitude threshold $V_2$ is also exceeded in the presence of an amplitude burst at the point 28. It is known that the interferences audible with a system having an antenna are strongly dependent upon the actual reception situation, have a greatly different character and strongly vary in time. Although with fixedly adjusted thresholds for the interference identification the interferences are identified very rapidly, the change-over frequency in the signal selector 19 then strongly depends upon the value and the kind of the interferences. In the presence of large interferences, the system changes over too frequently between the selector inputs 19-1, . . . , 19-n and in the presence of comparatively small, but still audible interferences the system does not proceed. Moreover, the system is not able to always pass the actually optimum signal from the supply of the selector input signals to the FM tuner with intermediate frequency part 2. Therefore, it is of particular advantage to adapt the thresholds dynamically to the average degree of interference. This degree of interference results from the extent of the amplitude fading, the multi-path reception with large travelling time differences, intermodulation interferences and adjacent channel interferences in the case of insufficient selectivity of the FM tuner with intermediate frequency part 2. It is very advantageous to increase the thresholds with an increasing average degree of interference. This ensures that the change-over frequency also in reception ranges with large interferences does not become too high and the very essential advantage is then obtained that due to the dynamic tracking of the thresholds the system passes that signal of the signals occurring at the input of the signal selector 19 to the FM tuner with intermediate frequency part 2 which has the smallest interference during the searching process. For this purpose, the degree of interference can be determined in known manner and the thresholds can be controlled correspondingly.

The thresholds are controlled in a particularly advantageous manner in accordance with the signal properties of the high-frequency signal and intermediate frequency signal 4, respectively. The frequency sweep properties of this signal 4 appear as the signal 27 at the output of the frequency demodulator 32. In a particularly advantageous manner, the frequency sweep threshold $V_1$ is obtained by means of a frequency threshold control device 40 from the output signal 27 of the frequency demodulator 32. In the case of the additional evaluation of the interference-dependent amplitude modulation, it is particularly advantageous to adjust dynamically also the amplitude threshold $V_2$. According to the invention, this is effected by means of an amplitude threshold control device 41, which forms the threshold $V_2$ from the output signal 28 of the amplitude demodulator 35.

Figure 11:
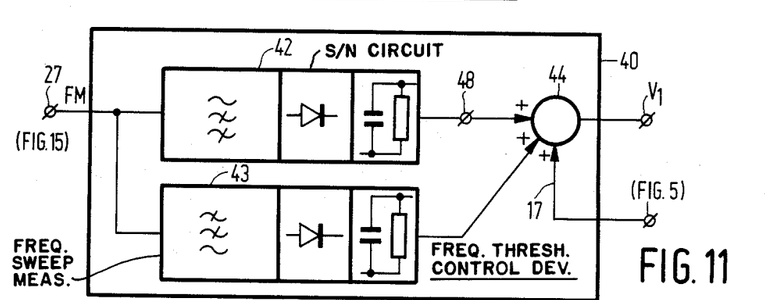
FIG. 11 shows an embodiment of a circuit arrangement for forming a dynamic threshold value for frequency sweep interferences for use in an evaluation circuit shown in FIG. 5.

FIG. 11 describes an advantageous embodiment of the frequency threshold control device 40. In this embodiment, the threshold $V_1$ tracked dynamically is formed from three subsignals. One of the three subsignals is derived from the signal-to-noise ratio. This is effected by means of the S/N circuit 42, which consists of a high-pass filter with a succeeding rectifier having a discharge time constant. The output signal 48 of the averaging circuit 42 is superimposed on the remaining subsignals in the summation circuit 44. In a particularly advantageous further embodiment of the circuit, one of the subsignals is obtained from the signal 27 by means of a device 43 for measuring the effective frequency sweep consisting of a low-pass filter with a succeeding first rectifier and a first integrator. In the embodiment of FIG. 11, a further subsignal in the form of the signal 27 is obtained from the binary switching signals 13 by the control circuit 9 of FIG. 5 with the aid of a change-over frequency detector 16 consisting of a rectifier circuit with an integrator. By suitable weighting of the subsignals superimposed in the summation circuit 44, a particularly favourable dynamic control of the frequency sweep threshold $V_1$ is attained. This weighting is to be carried out so that on the one hand the sensitivity of the interference indication is sufficiently high and on the other hand that a false indication is excluded by the effective frequency sweep.

The simultaneous use of the amplitude modulator with a dynamic amplitude modulation threshold $V_2$ is of particular advantage for the identification of the presence of the reception interferences mentioned above. The amplitude interference is characterized by short amplitude bursts in the signal 4. The depth of the amplitude bursts is a measure of the extent of the interference. In the case of freedom of interference the voltage at the output of the amplitude demodulator consists of a time-independent direct voltage, whose value corresponds to the amplitude of the signal 4, while in the case of interference it has corresponding bursts. In order to be able to estimate the extent of the occurring interference, the bursts must be measured for the direct voltage. This is effected by increasing the amplitude modulation threshold $V_2$ with increasing amplitude of the signal 4. This takes place by means of a low-pass filter in the circuit 46, at whose output one of the subvoltages for increasing the amplitude modulation threshold $V_2$ appears in the form of the signal 25. In order to be able to make a distinction between the different signal qualities of the antenna signals, it is necessary to additionally increase in a suitable manner the amplitude modulation threshold $V_2$ in dependence upon the amplitude bursts of the signal 4. This is effected advantageously by the additional use of a peak-value rectifier having a discharge time constant in the circuit 46, in which the output signal of the low pass filter is added to the output voltage of the peak-value rectifier. In a favorable further embodiment of the invention, the amplitude modulation threshold $V_2$ is increased correspondingly with decreasing signal-to-noise ratio in order to avoid too high a change-over frequency in signals having a high noise level. This noise is found back in the output signal 28 of the AM demodulator 35. The evaluation of the signal-to-noise ratio (S/N) is effected in the circuit 45 and is superimposed as a direct voltage 24 in the summation circuit 47 on the signal 25. The direct voltage 24 is then obtained, for example, by means of a high-pass filter and a succeeding rectifier with a low-pass filter having a cut-off frequency preferably lying below the lowest audible frequency. The cut-off frequency of the high-pass filter is chosen to be so high that it does not comprise the amplitude fluctuations (car movement) not leading to reception interferences.

Figure 12:
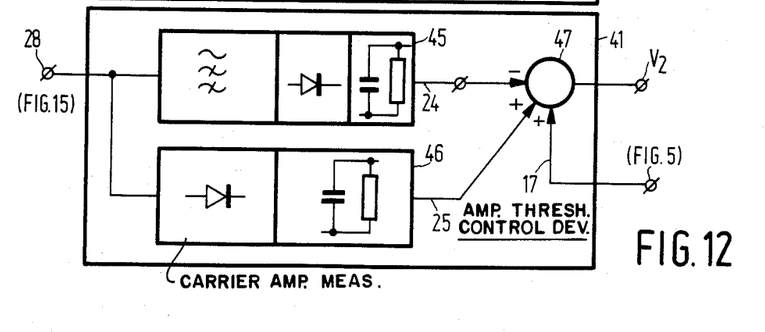
FIG. 12 shows an embodiment of a circuit arrangement for forming a dynamic threshold value for amplitude sweep interferences for use in an evaluation circuit shown in FIG. 5.

The integration of the signal-to-noise level (S/N), as described, is effected preferably by the time averaging circuits in the form of the low-pass filters succeeding the rectifiers for forming the signals at the leads 48 and 24, respectively, shown in FIGS. 11 and 12. This is effected, for example, in known manner by means of a capacitance.

In unfavourable reception situations with comparatively high average values of the interference these circuits 42 and 45 provide the possibility of suitably increasing the switching thresholds and hence of reducing the change-over frequency. Too high a change-over frequency is always associated with unsteadiness of the system and with residual interferences dependent upon the circuit. By the increase of the switching thresholds, it is ensured in an ideal manner that during driving the antenna 1-i (i=1, 2, . . . , n) with the optimum signal-tonoise ratio or only the signal combinations of the antenna with the better signals are always selected. By adjustment of a suitable discharge characteristic, the change-over frequency can be adjusted so that in the various service areas the searching operation for a noninterfered signal dynamically proceeds favourably. In the simplest case, the discharging operation is obtained in known manner by the parallel arrangement of an ohmic resistor and the capacitance. By adjustment of the discharge time constant, the aforementioned change-over frequency can be suitably chosen. It is of particular advantage if the discharge time constant is chosen to be considerably larger than the minimum occurring lock-on time of an antenna signal. In the case of an occurring interference exceeding the threshold, this lock-on time is limited to the checking time of the detector inclusive of the travelling time determined by the FM receiver with intermediate frequency part 2. The group travelling time of the FM receiver with intermediate frequency part 2 is generally limited on the lower side by its intermediate frequency bandwidth and is approximately 20 μs. In a further embodiment, the whole of the interferences is obtained in the form of a binary signal by means of the distortion detector 8 and is used in a suitable manner, as described below, for increasing the thresholds $V_1$ and $V_2$, respectively. The use of the sequence of binary signals at the lead 11 occurring at the output of the distortion detector 8, which are passed onto the control circuit 9, suits this purpose. The larger the frequency of the pulses, which, as already described, are produced in the control circuit 9 and indicate the presence of an interference, the poorer the actual reception signal quality and the larger consequently the whole of the interferences.

Figure 4:
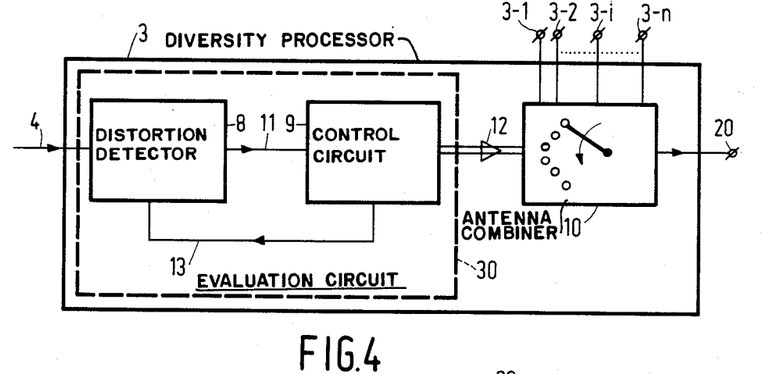
FIG. 4 shows a further embodiment of a block circuit diagram of a diversity processor for use in the antenna diversity system shown in FIG. 2.
Figure 5:
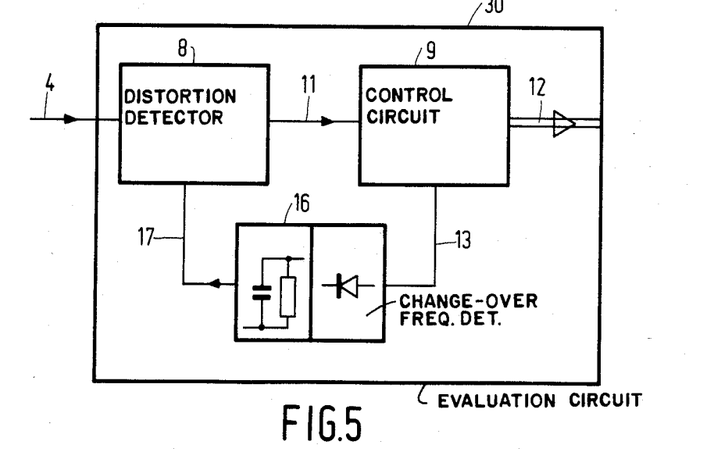
FIG. 5 shows a block circuit diagram of an evaluation circuit for use in the diversity processor shown in FIGS. 2 and 4.
Figure 6:
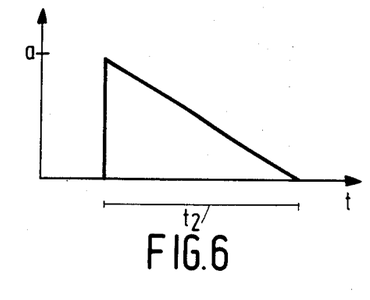
FIG. 6 shows a graphic representation of a time function of a ramp pulse as occurs in the evaluation circuit shown in FIG. 5.
Figure 7:
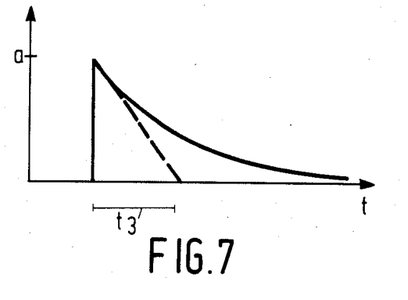
FIG. 7 shows a graphic representation of an exponential time function of another example of a ramp pulse as occurs in the evaluation circuit shown in FIG. 5.

In an embodiment shown in FIG. 4, either the frequency of occurrence of an interference is obtained from the binary signal at the lead 11, which is passed on by the distortion detector 8 to the control circuit 9, or is derived from the address signal at the lead 12, and is returned as a binary switching signal at the lead 13 to the distortion detector 8 and is used as a signal at the lead 17 in FIGS. 11 or 12 for increasing the threshold voltage $V_1$ or $V_2$. An embodiment is shown in FIG. 5, in which the frequency of occurrence of an interference is obtained from pulse signals by a change-over frequency detector 16, for example, a rectifier with a succeeding low-pass filter, and is supplied through the lead 17 to the distortion detector for increasing $V_1$ or $V_2$. The transformed and integrated pulses are directly superimposed on the instantaneous threshold voltage. This holds both for the amplitude threshold $V_2$ and for the frequency sweep threshold $V_1$. In a simple embodiment, the pulses can be transformed to a ramp function as shown in FIG. 6 and then be intregrated in the change-over frequency detector 16. The time $t_2$ of the ramp is then suitably adjusted so that, in dependence upon the average reception quality, a suitable change-over frequency is adjusted. In a further embodiment of the invention, an exponential function by charging a capacitor is used for integration and simultaneous discharge via a parallel-connected ohmic resistor. The discharge time constant $t_3$ in FIG. 7 can be suitably chosen by the choice of a suitable product of capacitance and resistance. These measures ensure that by a corresponding increase of the change-over thresholds $V_1$ and $V_2$ a limited change-over frequency is adjusted, even with reception signals inappropriate for reception at all antennae. The interferences produced by the continuous searching of the system for a signal appropriate for reception thus remain limited to a tolerable value. In the case of very large interferences, the frequency sweep interference peaks of all signals are so large that they exceed the respective thresholds $V_1$ and $V_2$. In this case, the optimum signal is selected at the input of the signal selector 19. A further advantageous embodiment determines the change-over frequency of the signal selector 19. Each time when the signal selector 19 proceeds, an amplitude jump is obtained in the intermediate frequency signal at the lead 4, depending upon the each time different instantaneous values of the carrier amplitude, at the different signal inputs 19-1, ..., 19-m of the signal selector 19. In a particularly simple embodiment, an FM demodulator sensitive to amplitude modulation, for example, a ratio detector, is used for producing pulses at the change-over instant, which demodulator gives off output pulses upon the occurrence of amplitude jumps. Such FM demodulators are known in the radio reception technique and have this property if the demodulator, as usual, is not tuned exactly to the intermediate frequency. These pulses are averaged in time in known manner and the actual average value is used for increasing the thresholds.

In a further embodiment, the change-over frequency is adapted to the occurring signal-to-noise ratio (S/N). In order to avoid that with too small a signal-to-noise ratio the change-over frequency becomes too high so that additional interferences are obtained by change-over, the signal-to-noise ratio (S/N) is determined. In the embodiment of FIG. 11, the average signal-to-noise ratio (S/N) is obtained by means of the S/N circuit 42. The latter consists of a high-pass circuit, whose cut-off frequency preferably lies above the highest occurring frequency of the effective modulation signal and of a succeeding rectifier circuit for averaging, which is effected by means of a succeeding integrator. In FIG. 11, the average signal-to-noise ratio of the signals at the signal inputs 19-1, ..., 19-m of the signal selector 19 is determined during the lock-on time by the S/N circuit 42. The term "lock-on time" is to be understood to mean the time within which the system does not proceed and consequently the instantaneous signal-to-noise ratio is smaller than the instantaneous value of an adjusted switching threshold.

In a further embodiment, the discharge time constant of the integrator is formed in the device 43 for measuring the effective frequency sweep (FIG. 11) in dependence upon the kind of modulation. For example, it is adjusted to be comparatively short with speech transmissions and to be comparatively long with music transmissions. With the use of a speech/music detector, the modulation sweep peaks which are generally larger with speech transmissions can be taken into account and a better ratio between change-over frequency and signal quality can be attained. In a particularly simple embodiment, the effective modulation frequency sweep is measured in known manner (FIG. 11) by the device 43 for measuring the effective frequency sweep and the discharge time constant is shortened correspondingly with increasing effective frequency sweep peaks. The discharge time constant can be adjusted in known manner by means of an electronically adjustable resistor and a constant capacitor. A further embodiment provides for a suitable increase of the frequency sweep threshold in dependence upon the frequency of the frequency sweep interference peaks.

It is particular advantage for the operation of the antenna diversity system 1 when the interference-dependent frequency sweep peaks and the simultaneously occurring interference-dependent amplitude bursts of the high-frequency or intermediate frequency carrier are evaluated simultaneouly. An amplitude burst is each time associated with the occurrence of frequency sweep interference peaks. The extent of the instantaneous degree of amplitude modulation, which occurs simultaneously with a frequency sweep interference peak, is measured with reference to the amplitude threshold $V_2$ (FIG. 15). If the burst exceeds the threshold and if at the same time a frequency sweep interference peak occurs, it is certain that the reception signal is instantaneously disturbed and the system should search for another signal at the input of the signal selector 19. The dynamic adjustment of the amplitude threshold in dependence upon the signal properties is here of particular advantage. The average value of the carrier amplitude at the output of a circuit 46 (FIG. 12) provides a favourable criterion for the adjustment of the amplitude threshold. With a decreasing average carrier amplitude, the average signal quality deteriorates and the maintenance of the change-over thresholds would lead to an uneffectively high change-over frequency. In order to avoid this disadvantage, the average carrier amplitude is determined by the circuit 46 and is used in the summation circuit 47 for adjusting the change-over threshold $V_2$.

In a further embodiment of the invention, the energy content of the frequency sweep interference peaks is also used for the evaluation of the frequency sweep interference. Especially with large interferences, it is desirable to make a distinction between the interferences of the different signals occurring at the signal inputs in order to be able to select the signal that is least interfered. With very large interferences, it is further desirable to limit the change-over frequency to a suitable extent. For example, these objects are achieved in that the frequency demodulator 32 in FIG. 15 is succeeded by a low-pass filter having a variably adjustable cut-off frequency (not shown). Thus, it is ensured that not only the instantaneous value of the interference-dependent frequency modulation, but due to the integration effect of the band-width limitation also the energy content of the interference peaks is evaluated. With large interferences, this measure also leads to longer detection times and hence to a limitation of the change-over frequency. Besides, there is the advantage of the analogous evaluability of large frequency sweep interferences, which can be used for increasing the change-over thresholds, so that the possibility further exists to select the optimum signal from the signals available at the selector input. It is particularly advantageous to adapt the frequency bandwidth of this filter to the signal quality in that with deteriorating signal quality the filter bandwidth is suitably reduced.

It has been found that in areas with a very poor reception signal too high a change-over frequency occurs. For selection of the optimum signal available under these conditions, the energy contained in the frequency sweep peaks is evaluated by integration and is superimposed on the actual frequency sweep interference signal.

In a further embodiment, the disadvantage of the naturally occurring delay of the dynamic control of the thresholds is avoided. This is obtained in that the signal is delayed after the FM demodulator 32 and the AM demodulator 35 by a given travelling time in such a manner that, for example, upon the occurrence of a large effective modulation sweep peak and the following comparison with the instantaneous threshold level $V_1$, the latter already has a value adapted to the large effective modulation sweep peak. The travelling time is chosen so that it approximately corresponds to the travelling time of the signal path between the FM demodulator output 27 and the input of the threshold value detector, in which the comparison with the signal takes place.

Figure 13:
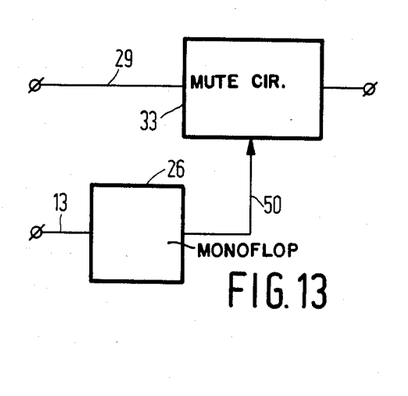
FIG. 13 shows an embodiment of a muting circuit for use in the antenna diversity system shown in FIG. 1.

It is of particular advantage to mute the low-frequency audible channel during the change-over times of the diversity processor 3 in order to make residual change-over interferences inaudible. The switching signals at the lead 50 required to this end (FIG. 13) are dissipated advantageously by the monoflop 26 through the lead 13 connected to the output of the control circuit 9. The mute circuit 33 is generally known. Either a suppression of the low-frequency signal at the lead 29 (FIG. 13) of the low-frequency part (not shown) of the FM receiver or, in order to avoid switching noise, the instantaneous voltage of this low-frequency signal can be held for the time of the mute circuit 33 so as to proceed after this time with the proceeding signal.

Figure 14:
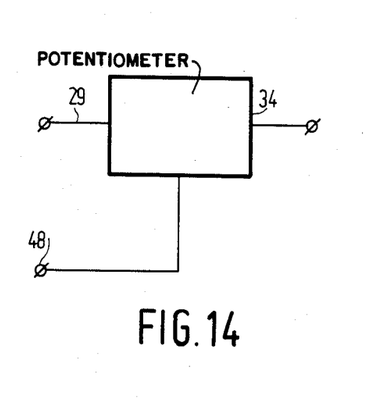
FIG. 14 shows an embodiment of a controlled amplification of the low-frequency signal in the receiver for use in the antenna diversity system shown in FIG. 1.

In a particular advantageous embodiment, the low-frequency signal is weighted by the average value of the output signal at the output 48 of the signal-to-noise ratio in the S/N circuit 42. With a decreasing signal-to-noise ratio, it is advantageous to decrease correspondingly the low-frequency signal at the lead 29 (FIG. 14) by means of a potentiometer 34, as a result of which residual interferences are weighted in a physiologically less disturbing manner.

We claim:

1. An antenna diversity system for the mobile reception of frequency-modulated signals comprising a receiver, antennae and a diversity processor coupled to the receiver, characterized in that the system comprises an FM tuner with an intermediate frequency part (2) coupled to the diversity processor and at least two antennae 1-i (i=1, 2, ..., n) coupled to the receiver and an intermediate frequency signal or high-frequency signal is supplied to the diversity processor (3), which signal corresponds to a given linear combination derived from the antenna signals by a linear combination means included in said intermediate frequency part, and in that the diversity processor (3) comprises an FM demodulator (32) with a succeeding frequency sweep threshold detector (31) and means by which, in dependence upon the occurrence of an interference-dependent frequency sweep pulse exceeding the frequency sweep threshold of the frequency sweep threshold detector (31) in the intermediate frequency or high-frequency signal, another linear combination derived from the antenna signals is supplied to the input side of the tuner with intermediate frequency part (2).

2. An antenna diversity system as claimed in claim 1, characterized in that the diversity processor (3) comprises an antenna combiner (10) having at least two antenna inputs 3-i (i=1, 2, ..., n) and a high-frequency output (20) and an evaluation circuit (30), while the intermediate frequency or high-frequency signal is supplied to the evaluation circuit (30), and that the evaluation circuit (30) comprises the frequency sweep threshold detector (31) to supply in dependence upon the occurrence of an interference-dependent frequency sweep pulse exceeding the frequency sweep threshold of the frequency sweep threshold detector (31) in the intermediate frequency or high-frequency signal, an address signal (12) to the antenna combiner (10), which passes in accordance with the address signal (12) one of the linear combinations of antenna signals on to the high-frequency output (20).

3. An antenna diversity system as claimed in claim 2, characterized in that the antenna combiner (10) comprises a matrix circuit (18) having n antenna inputs (3-1, ..., 3-n) and m signal outputs, which forms m linear combinations from the n antenna signals and supplies them to the m signal outputs, as well as a signal selector (19) having m signal inputs (19-1, ..., 19-m) connected to the signal outputs of the matrix circuit (18), a high-frequency output (20) and an input (12-1), while the signal selector (19) passes the signal of that signal input (19-1, ... 19-m) on to the high-frequency output (20) which corresponds to an address word present at an address input (12).

4. An antenna diversity system as claimed in claim 3, characterized in that the matrix circuit (18) comprises a summation circuit (38) and each antenna input (3-1, ..., 3-n) is each time connected through a phase shift device (22-1-1, ..., 22-1-j; ...; 22-n-1, ..., 22-n-k, where j ..., k are arbitrary integers), whose phase is suitable adjusted, and through an amplitude weighting device (23-1-1, ..., 23-1-j; ...; 23-n-1, ... 23-n-k, where j, ..., k are arbitrary integers), whose weighting factor is suitably adjusted, to the inputs (38-1-1; 38-1-j; ...; 38-n-1, ..., 38-n-k) of the summation circuit (38) and each output of the summation circuit (38) is connected to one of the m signal inputs (19-1, ..., 19-m) of the signal selector (19).

5. An antenna diversity system as claimed in claim 4, characterized in that the number n of antenna inputs (3-1, ..., 3-n) of the matrix circuit (18) and the number m of signal inputs (19-1, ..., 19-n) of the signal selector (19) are equal and each antenna input (3-1, ..., 3-n) is connected through an amplitude weighting device (23) each time to one of the m signal inputs (19-1, ..., 19-m) of the signal selector (19) and the weighting factor is suitably adjusted.

6. A reception system as claimed in claim 5, characterized in that the amplitude weighting devices (23) are adjusted so that the time-averaged values of the signal-to-noise ratios of all selector input signals (19-1, ..., 19-m) are as equal as possible.

7. An antenna diversity system as claimed in claim 3, characterized in that the matrix circuit (18) comprises two antenna inputs (3-1 and 3-2) and a summation circuit (21-1) and a subtraction circuit (21-2), the antenna inputs (3-1, 3-2) being connected on the one hand both to the summation circuit (21-1) and to the subtraction circuit (21-2) and the summation and subtraction circuits being connected to a signal input (19-2, 19-3) of the signal selector (19) and on the other hand each antenna input being directly connected to a further signal input (19-1, 19-4) of the signal selector (19).

8. An antenna diversity system as claimed in claim 3, characterized in that the evaluation circuit (30) comprises a distortion detector (8) and a control circuit (9) and the distortion detector (8) is connected to the tuner with intermediate frequency part (2), while a binary logic signal (11) is supplied to the control circuit (9) in dependence upon the occurrence of an interference-dependent frequency sweep pulse exceeding the frequency sweep threshold of the frequency sweep threshold detector (31) in the intermediate frequency signal (4), or additionally of an amplitude burst exceeding the amplitude threshold of the amplitude threshold detector (36), and the distortion detector (8) supplies in response to the binary logic signal (11) a suitable address signal (12) to an address input (12-1) of the signal selector (19).

9. An antenna diversity system as claimed in claim 8, characterized in that the control circuit (9) connects the signal inputs (19-1, ..., 19-m) of the signal selector (19) to the FM tuner with intermediate frequency part (2) according to a priority list.

10. An antenna diversity system as claimed in claim 3, characterized in that the evaluation circuit (30) comprises a change-over frequency detector (9, 16) to control, in dependence upon the detected frequency of the signal change-overs, the antenna signal combinations supplied to the tuner with intermediate frequency part (2).

11. An antenna diversity system as claimed in claim 10, characterized in that the change-over frequency detector (9, 16) comprises a pulse generator included in the control circuit (9) for generating pulses in dependence upon the binary logic signal supplied to the control circuit (9) and a rectifier with a succeeding integrator connected between the control circuit (9) and the distortion detector (8) for controlling the frequency sweep threshold ($V_1$) and additionally the amplitude threshold ($V_2$).

12. An antenna diversity system as claimed in claim 11, characterized in that the integrator is connected to the summation circuit (44).

13. An antenna diversity system as claimed in claim 11, characterized in that the integrator is connected to the summation circuit (44) and additionally to the subtraction circuit (47).

14. An antenna diversity system as claimed in claim 1, characterized in that the diversity processor (3) comprises a frequency sweep threshold control device (40) connected between the FM demodulator (31) and an input terminal ($V_1$) of the frequency sweep threshold detector (31) for dynamically controlling the frequency sweep threshold ($V_1$) and additionally an amplitude threshold control device (41) connected between an AM demodulator (35) and an input terminal ($V_2$) of an amplitude threshold detector (36) for dynamically controlling the amplitude threshold ($V_2$) of the amplitude threshold detector (36).

15. An antenna diversity system as claimed in claim 14, characterized in that the frequency sweep threshold control device (40) comprises a high-pass filter with a succeeding rectifier and integrator (S/N circuit 42) connected to a summation circuit (44) and a low-pass filter with a succeeding first rectifier and first integrator (device 43 for measuring the effective frequency sweep) connected to the summation circuit (44), and in that the amplitude threshold control device (41) comprises a device (46) for measuring the degree of modulation connected to a subtraction circuit (47) and a second rectifier with a succeeding second integrator (46) connected to the second subtraction circuit (47).

16. An antenna diversity system for the mobile reception of frequency-modulated oscillations comprising a receiver, antennae and a diversity processor coupled to the receiver, characterized in that the system comprises an FM tuner with an intermediate frequency part (2) coupled to the diversity processor and at least two antennae 1-i (i=1, 2, ... n) coupled to the receiver, and in that an intermediate frequency or high-frequency signal is supplied to the diversity processor (3), which signal corresponds to a given linear combination derived from the antenna signals by a linear combination means included in said intermediate frequency part, and in that the diversity processor (3) comprises an AM demodulator (35) with a succeeding amplitude threshold detector (36), an FM demodulator (32) with a succeeding frequency sweep threshold detector (31) and means by which, upon the simultaneous occurrence of an amplitude burst exceeding the amplitude threshold of the AM threshold detector (36) and of an interference-dependent frequency sweep pulse exceeding the frequency sweep threshold of the frequency sweep threshold detector (31) in the intermediate frequency or high-frequency signal, another linear combination derived from the antenna signals is supplied to the input side of the tuner with intermediate frequency part (2).

17. An antenna diversity system as claimed in claim 16, characterized in that the diversity processor (3) comprises an antenna combiner (10) having at least two antenna inputs 3-i (i=1, 2, ..., n) and a high-frequency output (20) and an evaluation circuit (30), while the intermediate frequency or high-frequency signal is supplied to the evaluation circuit (30), and in that the evaluation circuit (30) comprises the frequency sweep threshold detector (31) and the amplitude threshold detector (36) to supply, in dependence upon the simultaneous occurrence of an interference-dependent frequency sweep pulse exceeding the frequency sweep threshold of the frequency sweep threshold detector (31) in the intermediate frequency signal and of an amplitude burst exceeding the amplitude threshold of the amplitude threshold detector (36), an address signal (12) to the antenna combiner (10), which passes in accordance with the address signal (12) one of the linear combinations of antenna signals on to the high-frequency output (20).

* * * * *